United States Patent
Brück et al.

(10) Patent No.: US 9,909,477 B2
(45) Date of Patent: Mar. 6, 2018

(54) METHOD FOR PROVIDING A LIQUID ADDITIVE

(71) Applicant: EMITEC GESELLSCHAFT FÜR EMISSIONSTECHNOLOGIE MBH, Lohmar (DE)

(72) Inventors: Rolf Brück, Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/767,513

(22) PCT Filed: Jan. 27, 2014

(86) PCT No.: PCT/EP2014/051508
§ 371 (c)(1),
(2) Date: Aug. 12, 2015

(87) PCT Pub. No.: WO2014/124799
PCT Pub. Date: Aug. 21, 2014

(65) Prior Publication Data
US 2015/0377106 A1 Dec. 31, 2015

(30) Foreign Application Priority Data
Feb. 13, 2013 (DE) .................. 10 2013 101 412

(51) Int. Cl.
*F01N 3/20* (2006.01)
*F04C 5/00* (2006.01)
(Continued)

(52) U.S. Cl.
CPC .......... *F01N 3/208* (2013.01); *F01N 3/2066* (2013.01); *F04B 43/08* (2013.01); *F04B 43/123* (2013.01);
(Continued)

(58) Field of Classification Search
CPC .... F01N 3/2066; F01N 3/208; F01N 2610/02; F01N 2610/1433; F01N 2610/144;
(Continued)

(56) References Cited

U.S. PATENT DOCUMENTS

| 5,377,637 A | 1/1995 | Leighton et al. |
| 2005/0047925 A1* | 3/2005 | Davis .................. B41J 2/17596 417/53 |

(Continued)

FOREIGN PATENT DOCUMENTS

| CN | 101326369 | 12/2008 |
| CN | 201284738 | 8/2009 |

(Continued)

OTHER PUBLICATIONS

Office Action dated Oct. 17, 2016 which issued in the corresponding Russian Patent Application No. 2015138935/06.
(Continued)

*Primary Examiner* — Brandon Lee
(74) *Attorney, Agent, or Firm* — Cozen O'Connor (57) ABSTRACT

A method for operating a device for providing a liquid additive having at least one suction point for removing liquid additive from a tank, a valve-free conveying line extending from the suction point to a supply unit, and a valve-free displacement pump, the displacement pump being configured to convey the liquid additive from the tank via the suction point along the conveying line to the supply unit, the displacement unit having at least one seal of the conveying line, displaceable along the conveying line for conveying the liquid additive, includes: a) detecting a stoppage of operation of the device; b) establishing a position of the seal within the positive-displacement pump; and c) changing the position of the seal if the position of the seal does not correspond to a provided park position of the seal.

8 Claims, 5 Drawing Sheets

(51) Int. Cl.
*F04B 43/08* (2006.01)
*F04B 43/12* (2006.01)

(52) U.S. Cl.
CPC ............ *F04C 5/00* (2013.01); *F01N 2610/02* (2013.01); *F01N 2610/144* (2013.01); *F01N 2610/1433* (2013.01); *F04C 2210/1083* (2013.01); *Y02T 10/24* (2013.01)

(58) Field of Classification Search
CPC .......... F04B 43/08; F04B 43/123; F04C 5/00; F04C 2210/1083; Y02T 10/24
See application file for complete search history.

(56) References Cited

U.S. PATENT DOCUMENTS

| | | |
|---|---|---|
| 2009/0047163 A1 | 2/2009 | Fujita |
| 2009/0301064 A1* | 12/2009 | Maier .................. F01N 3/2066 60/286 |
| 2013/0000743 A1 | 1/2013 | Crary |
| 2013/0104527 A1 | 5/2013 | Liljestrand et al. |

FOREIGN PATENT DOCUMENTS

| | | |
|---|---|---|
| CN | 201865731 U | 6/2011 |
| CN | 202325773 U | 7/2012 |
| DE | 102006061731 | 7/2008 |
| EP | 1 241 355 A2 | 9/2002 |
| JP | 2004-042577 | 2/2004 |
| JP | 2007-154831 | 6/2007 |
| JP | 2008-095573 | 4/2008 |
| RU | 2105161 | 2/1998 |
| RU | 90488 | 1/2010 |
| WO | WO 2011/162692 | 12/2011 |

OTHER PUBLICATIONS

Office Action dated Aug. 15, 2016 which issued in the corresponding Japanese Patent Application No. 2015-557362.
Office Action dated Jan. 10, 2017 which issued in the corresponding Korean Patent Application No. 10-2015-7025096.
Office Action dated Feb. 27, 2017 which issued in the corresponding Chinese Patent Application No. 201480008483.8.

* cited by examiner

METHOD FOR PROVIDING A LIQUID ADDITIVE

CROSS-REFERENCE TO RELATED APPLICATIONS

This is a U.S. national stage of application No. PCT/EP2014/051508, filed on 27 Jan. 2014, which claims priority to the German Application No. DE 10 2013 101 412.7 filed 13 Feb. 2013, the content of both incorporated herein by reference.

BACKGROUND OF THE INVENTION

1. Field of the Invention

The invention relates to a method for operating a device for supplying a liquid additive.

2. Related Art

Such devices are used in particular in the automotive sector for the purposes of feeding a liquid additive (fuel, water, ammonia, etc.) to an exhaust-gas treatment device. In particular for the purification of exhaust gases of diesel internal combustion engines, use is made of exhaust-gas treatment devices in which nitrogen oxide compounds in the exhaust gas are converted to non-hazardous substances (nitrogen, carbon dioxide and water) with the aid of a reducing agent—this is the method of selective catalytic reduction (SCR), such as is known to a person skilled in the art. The reducing agent may, for example, be fed in the form of liquid additive to the exhaust-gas treatment device. In this context, urea-water solution is commonly used as liquid additive. A 32.5% urea-water solution is available under the trade name AdBlue® as additive for exhaust-gas treatment.

Devices for supplying a liquid additive for motor vehicles should be as inexpensive as possible and should be constructed using the smallest possible number of different components.

A problem of typical liquid additives is that they can freeze at low temperatures. AdBlue® freezes, for example, at −11° C. In motor vehicles, such low temperatures may arise in particular during relatively long standstill phases in winter. The freezing process causes a volume expansion of the aqueous additive. The volume expansion can damage the device for supplying the liquid additive. This is a problem in particular with regard to components for delivering the liquid additive (such as for example in pumps).

It is possible to design the device for supplying the liquid additive such that it is not damaged as a result of freezing of the liquid additive. This concept is generally relatively expensive. Another possibility is to evacuate the device for supplying the liquid additive after a stoppage of operation of the internal combustion engine, such that no liquid additive can freeze in the device during a standstill phase. This concept however necessitates further actions after the stoppage of operation, which actions may be associated with noise and place an increased burden on energy stores.

SUMMARY OF THE INVENTION

Taking this as a starting point, it is an object of the present invention to solve, or at least lessen, the technical problems of the prior art. It is sought in particular to specify a method for operating a device for supplying liquid additive (in particular urea-water solution), which method permits particularly good protection of the device against freezing liquid additive.

The invention relates, in accordance with one aspect of the invention, to a method for operating a device for supplying a liquid additive, which device has at least the following components:

an intake point for the extraction of liquid additive from a tank, a valve-free delivery line which runs from the intake point to a supply unit, and a valve-free positive-displacement pump, wherein the positive-displacement pump is designed to deliver the liquid additive from the tank via the intake point and along the delivery line to the supply unit, and wherein the positive-displacement pump has at least one seal of the delivery line, which at least one seal can be displaced along the delivery line for the purposes of delivering the liquid additive.

The method comprises at least the following steps:

a) detecting a stoppage of operation of the device;
b) establishing a position of the seal within the positive-displacement pump; and
c) changing the position of the seal if the position of the seal does not correspond to a provided park position.

An intake point refers in particular to an opening at which a delivery line for the delivery of the liquid additive opens into the tank. Liquid additive is drawn through the intake point from the tank into the delivery line when the pump of the device delivers liquid additive. The intake point is preferably arranged in a lower region of a tank (in particular on the tank base), such that the tank can be evacuated as completely as possible via the intake point.

In other words, a valve-free delivery line also means that the liquid additive does not pass any valves on its path from the intake point through the delivery line to a supply unit. In particular, no valves are passed in the pump that is arranged in the delivery unit. An exception here may be merely a (dosing) valve provided in the supply unit. Accordingly, a valve may be provided in the supply unit, yet a valve-free delivery line is nevertheless realized in the context discussed here. The delivery line is preferably formed by a hose and/or a duct which is arranged for example in a block or in a base plate of the delivery unit. A duct of this type in a block may be formed for example by way of bores.

The supply unit is preferably an injector by which the liquid additive (in particular urea-water solution) can be conducted to an exhaust-gas treatment device. The supply unit may comprise a nozzle that ensures the fine atomization of the liquid additive in the exhaust-gas treatment device. The supply unit may alternatively or additionally also have a dosing structure (in particular a dosing valve) by which apportioning or demand-dependent dosing of the liquid additive can be realized. The dosing by a dosing valve is generally performed by way of the opening time of the dosing valve. The duration for which the dosing valve is open is typically proportional to the amount of liquid additive that is dosed. This relationship permits accurate dosing.

A positive-displacement pump used here is a pump in which the liquid additive is delivered by at least one closed-off volume. A return flow of the liquid additive is prevented by way of the closed-off volume. Positive-displacement pumps are to be regarded separately from flow-type pumps in which a liquid is delivered, for example, by way of a propeller and/or stirring mechanism. In the case of positive-displacement pumps, in a shut-off situation (when the pump is deactivated), it is generally the case that no return flow of the liquid additive is possible, whereas in the case of flow-type pumps, a return flow is possible when the propeller or the stirring mechanism is no longer moving.

In the case of flow-type pumps, the delivery flow rate is generally dependent on the pressure difference generated by the pump, because, in parallel with the delivery flow, a return flow arises, which is dependent on the pressure difference generated by the pump. Such return flow and the delivery flow are superposed and yield the delivery flow rate. This relationship typically does not exist in the case of positive-displacement pumps. At least in the range of intended pressure differences, the delivery flow rate is not influenced by the generated pressure difference. In particular in the case of low delivery speeds, a constant pressure increase is possible by positive-displacement pumps, whereas in the case of flow-type pumps, the possibilities for increasing pressure are in each case highly dependent on the delivered flow rate of liquid.

Valve-free positive-displacement pumps are positive-displacement pumps in which the liquid additive does not flow through any (separate) valves as it flows into and out of the pump volumes. In the case of such valve-free positive-displacement pumps, at least one seal of the delivery line is preferably provided. The seal forms at least one closed pump volume within the positive-displacement pump, and can be displaced along the delivery line in a delivery direction for the purposes of delivering the liquid additive. In this way, the pump volumes which are filled with liquid additive are also displaced, and the liquid additive is delivered.

The positive-displacement pump is preferably a positive-displacement pump with a reversible delivery direction. The statement that the delivery direction of the positive-displacement pump is reversible means in particular that the positive-displacement pump can be operated in two different/opposite flow directions. A drive is preferably provided, the drive direction of which is reversible. By reversing the operating direction of the drive, the delivery direction of the positive-displacement pump is then also reversed. By a reversal of the delivery direction of the positive-displacement pump, it is made possible for the delivery line of the device to be evacuated counter to the normal delivery direction. Liquid additive situated in the delivery line is delivered from the delivery line back into the tank via the intake point.

Such a positive-displacement pump in a device for supplying a liquid additive makes it possible to realize evacuation of the delivery line without the need for a large number of different additional components. For evacuation purposes, the delivery direction of the positive-displacement pump can be reversed in order to evacuate the positive-displacement pump from the supply unit in the direction of the tank.

The stoppage of operation of the device in step a) occurs, for example, upon the deactivation of a motor vehicle in which the described device is integrated. After a stoppage of operation, the device would be deactivated as well, and there is the risk of the device being exposed to low ambient temperatures, and of the liquid additive contained therein freezing and causing damage. To prevent this, the following steps are also (retroactively) performed during the deactivation procedure.

In step b), a position of the seal within the positive-displacement pump is detected. During delivery by the positive-displacement pump, the at least one seal is preferably moved through the positive-displacement pump. The position of the seal upon the stoppage of operation may be determined mathematically and/or using a sensor that detects the position of the seal. A sensor of this type may also be arranged on a drive of the positive-displacement pump, and monitor the position of the drive. The drive of a positive-displacement pump is preferably (rigidly) connected to the seal such that the position of the drive makes it possible to make a statement regarding the position of the seal.

The provided park position of the seal is a position within the displacement pump at which the at least one seal is intended to be arranged during a standstill phase of the device. In particular, for the positive-displacement pump, a (single) park addition is defined, such that the seal is transferred into the park position upon the stoppage of operation regardless of the present position. The park position is in particular stored in, and retrievable from, a control unit. When the at least one seal is in the park position, the risk of damage being caused to the device by freezing liquid additive is particularly low, or at its lowest.

The active monitoring and adjustment of the position of the seal in the positive-displacement pump upon every stoppage of operation, or upon a stoppage of operation in the presence of critical ambient temperatures, permits gentle operation and thus also permanently accurate delivery/dosing.

The method is furthermore advantageous if the positive-displacement pump has a rotary drive and a movable pump element, wherein the movable pump element is moved in a rotary movement for delivery purposes.

If the drive is a rotary drive, the position of the drive that is monitored may, for example, be a present angle of the rotary drive. A rotary drive may, for example, be implemented particularly inexpensively using an electric motor, the direction of rotation of which can be reversed by way of the electrical polarity. The movable pump element optionally performs a rotation or an eccentric rotary oscillation, in which the pump element maintains its basic orientation but is displaced in accordance with a rotary movement. The so-called eccentric rotary oscillation of a movable pump element may be generated by a rotating eccentric driven by a rotary drive. A rotary drive and a correspondingly moved pump element permit particularly energy-efficient drive of the positive-displacement pump.

The method is also advantageous if, on the movable pump element, there are provided barbs which can interlock if the movable pump element is moved in a direction of rotation counter to the delivery direction, and the barbs are arrested in the park position after step c).

The concept can also be transferred to other pumps for the described devices. It is possible in particular for components to be provided on the movable pump element which lead to particularly good sealing of at least one pump volume if the movable pump element is moved to a small extent (for example by a few angular degrees) counter to the delivery direction. The components may, for example, be formed in the manner of barbs, and in particular in the manner of harpoon-like barbs. The barbs seal in fluid-tight fashion against a surface of the pump volumes by being pressed against a surface of the pump volumes when the movable pump element is moved to a small extent counter to the delivery direction. The barbs are preferably designed so as to release from the surface of the pump volumes again when the movable pump element is moved further counter to the delivery direction. When they release, the barbs may, for example, turn over or fold over. A free movement of the movable pump element counter to the delivery direction is then possible, by which the pump can be evacuated. To close off the pump in fluid-tight fashion again by the barbs, the movable pump element should initially be moved in the delivery direction again in order that the barbs resume their initial position. Subsequently, the pump volumes can be closed off again by a (small) movement counter to the delivery direction. The described sealing action by the barbs is preferably increased in relation to the normal sealing action of the pump volumes such that the sealing by the barbs does not allow any liquid additive through even in the presence of pressures above the operating pressure. For example, said increased sealing action may also be sufficient to keep an ice pressure, which arises when liquid additive freezes in the device, away from components of the device for supplying liquid additive. A hook structure may be provided on a housing of the positive-displacement pump, which hook structure promotes the interlocking of the barbs. By the interlocking of the barbs in the park position, it can be achieved that liquid additive cannot pass the seal in the park position even if the pressure greatly increases owing to the volume expansion of the freezing liquid additive.

The method is also advantageous if the positive-displacement pump has at least one flexible seal element for forming the at least one seal, wherein the flexible seal element is suitable for enlarging at least one pump volume of the positive-displacement pump if a pressure higher than an operating pressure of the device prevails within the at least one pump volume.

The flexible seal element may, for example, be a diaphragm, a hose, an impeller and/or a pinch disk. The flexible seal element is, during the operation of the positive-displacement pump, deformed in order to displace the at least one seal. The flexible seal element preferably also forms at least one section of a wall of a pump volume. Below, different types of positive-displacement pumps, which have a flexible seal element for forming at least one seal, will be presented.

A flexible seal element may have a very large surface directed toward the at least one pump volume, and in particular, forms large parts (for example more than 50% or even more than 70%) of the wall of the pump volume. Furthermore, the seal element is flexible in order to provide a displaceable seal. Therefore, a pump with a flexible seal element makes it possible, in the event of freezing, to realize a very large compensation volume for compensating a volume expansion of the liquid additive as it freezes.

The method is furthermore advantageous if, in the provided park position, an inlet of the positive-displacement pump is closed off by the at least one seal.

The positive-displacement pump preferably has an inlet through which liquid additive is drawn into the positive-displacement pump, and an outlet at which the positive-displacement pump discharges liquid additive. The positive-displacement pump preferably forms a section of a delivery line through the device. The section of the delivery line between the inlet and the outlet (or a sub-region thereof) forms the at least one pump volume of the positive-displacement pump. When an inlet of the positive-displacement pump is closed off, it is ensured that no liquid additive can flow into the at least one pump volume of the positive-displacement pump from a section of the delivery line upstream of the inlet as viewed in the delivery direction. It is preferably the case that, then, no seal is arranged (at the same time) at the outlet, such that the outlet of the positive-displacement pump is free. Then, in the event of a volume expansion of the liquid additive in the event of freezing, volume compensation is possible between the at least one pump volume of the positive-displacement pump and a section of the delivery line downstream of the outlet as viewed in the flow direction.

The method is furthermore advantageous if, in the provided park position, an outlet of the positive-displacement pump is closed off by the at least one seal.

When an outlet of the positive-displacement pump is closed off, it is ensured that no liquid additive can flow into the at least one pump volume of the positive-displacement pump from a section of the delivery line downstream of the outlet as viewed in the delivery direction. It is preferably the case that, then, no seal is arranged (at the same time) at the inlet, such that the inlet of the positive-displacement pump is free. Then, in the event of a volume expansion of the liquid additive in the event of freezing, volume compensation is possible between the at least one pump volume of the positive-displacement pump and a section of the delivery line upstream of the inlet as viewed in the flow direction.

The method is furthermore advantageous if, in the provided park position, an inlet and an outlet of the positive-displacement pump are open.

Then, in the event of a volume expansion of the liquid additive in the event of freezing, volume compensation is possible between the at least one pump volume of the positive-displacement pump and both a section of the delivery line upstream of the inlet as viewed in the flow direction and a section of the delivery line downstream of the outlet as viewed in the flow direction.

The method is furthermore advantageous if the positive-displacement pump has a rigid overall pump volume, which does not change even if a pressure in the positive-displacement pump lies above an operating pressure of the device, and wherein, in the provided park position, both the inlet and the outlet are closed off by the at least one seal.

Positive-displacement pumps with a rigid overall volume are in particular pumps that have a rigid external housing in which the at least one pump volume is situated. The rigid housing normally does not contain any components which, in the event of freezing, could be significantly compressed and thus open up an additional volume. Such positive-displacement pumps with a rigid overall pump volume could be destroyed if, in the event of freezing, relatively large displacements of liquid additive and/or frozen additive into the positive-displacement pump were to occur. For this reason, in the case of pumps of this type, it is advantageous if both the inlet and the outlet are closed off upon a stoppage of operation of the device. Then, in the event of freezing, the positive-displacement pump is protected against displacements into the at least one pump volume.

A positive-displacement pump, which is particularly advantageous for the described method, has a stator situated at the inside and a movable pump element arranged around the stator at the outside.

According to a first concept, the movable pump element is surrounded by a non-movable housing. The movable pump element moves in the non-movable housing. According to a second concept, the movable pump element is arranged around a stator situated at the inside. The movable pump element moves around the stator. Pump volumes in which the liquid additive is delivered by the positive-displacement pump are, in the case of the first concept, arranged between the housing and the movable pump element and, in the case of the second concept, arranged between the movable pump element and the stator. The flexible seal element may then be formed by the stator situated at the outside or by the movable pump element situated at the inside.

It is furthermore advantageous if the positive-displacement pump is a peristaltic pump. In the case of a peristaltic pump, constrictions or closures are moved along a delivery line through the peristaltic pump in a delivery direction. The constrictions or closures generate possibly multiple closed pump volumes along the delivery line. By the constrictions or closures, the liquid additive (in particular urea-water solution) is displaced along the delivery line through the peristaltic pump. Typically, the constrictions or closures are formed at the upstream end of the delivery path in the peristaltic pump, and are moved in continuous fashion toward the downstream end of the delivery line in the peristaltic pump. At the downstream end, the constrictions or closures are then eliminated again. A peristalsic pump permits particularly gentle and accurate delivery of the liquid additive, by which particularly low stresses and friction arise in the liquid additive. In this way, crystallization of constituents of the liquid additive in the delivery pump can be prevented.

Furthermore, a device is considered to be advantageous if the positive-displacement pump is a type of hose-type pump. In the case of a hose-type pump, a hose is compressed at various points, such that constrictions or closures are formed in a delivery path, formed by the hose, through the positive-displacement pump. The compressed points of the hose are displaced such that the liquid additive is delivered along the delivery path running through the hose. A hose-type pump of this type is a particularly simple and therefore particularly inexpensive variant of a peristaltic pump, which for this reason is particularly advantageous for a device for supplying liquid additive. In the case of a peristaltic pump, the flexible seal element is normally formed by the hose.

The device is furthermore advantageous if the positive-displacement pump is an impeller-type pump. In the case of an impeller-type pump, the movable pump element is an impeller that can rotate in a housing. The housing has an inlet and an outlet through which liquid additive can flow into the housing (inlet) and out of the housing (outlet). The impeller has impeller arms that bear sealingly against an outer side of the housing by way of a seal and which thus form separated pump volumes in the housing. By a rotary movement of the impeller, the pump volumes formed by the impeller arms are displaced, such that the liquid additive can flow from the inlet to the outlet. In a region between the outlet and the inlet, the impeller arms of the impeller are compressed or pressed against by an indentation of the housing. In this way, the pump volumes between the impeller arms are greatly reduced in size. Therefore, a considerably smaller amount of liquid additive is delivered from the outlet to the inlet than from the inlet to the outlet.

The impeller is constructed such that a reversal of the direction of rotation of the impeller is also possible. In this way, the delivery direction of the pump is reversed. The inlet then acts as the outlet, and vice versa. In order that a reversal of the direction of rotation is possible, a special design of the impeller arms of the impeller is required. Upon the reversal of the direction of rotation, the impeller arms must not become jammed in the housing and block the rotation.

The impeller may also be designed such that the impeller arms of the impeller are clamped against the housing, or are at least partially braced in the housing, when the impeller is moved only to a small extent (for example by a few angular degrees) counter to the previously prevailing delivery direction. In this way, particularly good sealing of the pump volumes can be realized, such that no return flow of liquid additives through the positive-displacement pump is possible. Such sealing may be advantageous for example in order to firmly seal off the positive-displacement pump upon a deactivation of the device such that any ice pressure that arises does not open the positive-displacement pump. An impeller-type pump is typically a pump with a rigid overall pump volume. An impeller-type pump typically has a housing in which the impeller is arranged and which could possibly be destroyed as a result of a volume expansion of liquid additive within the impeller pump. Therefore, in the case of an impeller-type pump, it is very particular advantageous if both the inlet and the outlet are closed off by a seal in a shut-down situation.

The positive-displacement pump may be arranged in a housing on the tank for the liquid additive, and the delivery line between the positive-displacement pump and the supply unit may have a length of at least 1 meter.

The positive-displacement pump is preferably arranged in a housing that may be located at an underside of a tank in the tank base. For this purpose, the tank base may, for example, have a chamber separated from the interior of the tank and in which the positive-displacement pump is arranged. The chamber may also be in the form of a housing that can be inserted into an opening in the base of the tank. The housing is preferably free from liquid additive when the tank interior is filled with liquid additive. The intake point for the extraction of the liquid additive from the tank is preferably arranged directly on an outer side of the housing, and thus opens into the interior of the tank.

The invention is used in particular in a motor vehicle, having 2 an internal combustion engine, having an exhaust-gas treatment device for purifying the exhaust gases of the internal combustion engine and having a device by which a liquid additive can be fed to the exhaust-gas treatment device and which can be operated in accordance with the described method. The context here is very particularly preferably a delivery system for urea-water solution to an SCR catalytic converter, as discussed in the introduction.

BRIEF DESCRIPTION OF THE DRAWINGS

The invention and the technical field will be explained in more detail below on the basis of the figures. The figures show particularly preferred exemplary embodiments, to which the invention is, however, not restricted. In particular, it should be noted that the figures and in particular the illustrated proportions are merely schematic. In the figures.

DETAILED DESCRIPTION OF THE PRESENTLY PREFERRED EMBODIMENTS

In the figures, the same reference numerals are always used for identical components. Below, FIGS. 1 to 3, which illustrate various design variants of a device 1, will firstly be discussed jointly, to the extent that the illustrations exhibit common features. The devices 1 are suitable/set up for carrying out the described method, and permit the dosed metering of liquid additive into an exhaust-gas treatment device.

Figure 1:
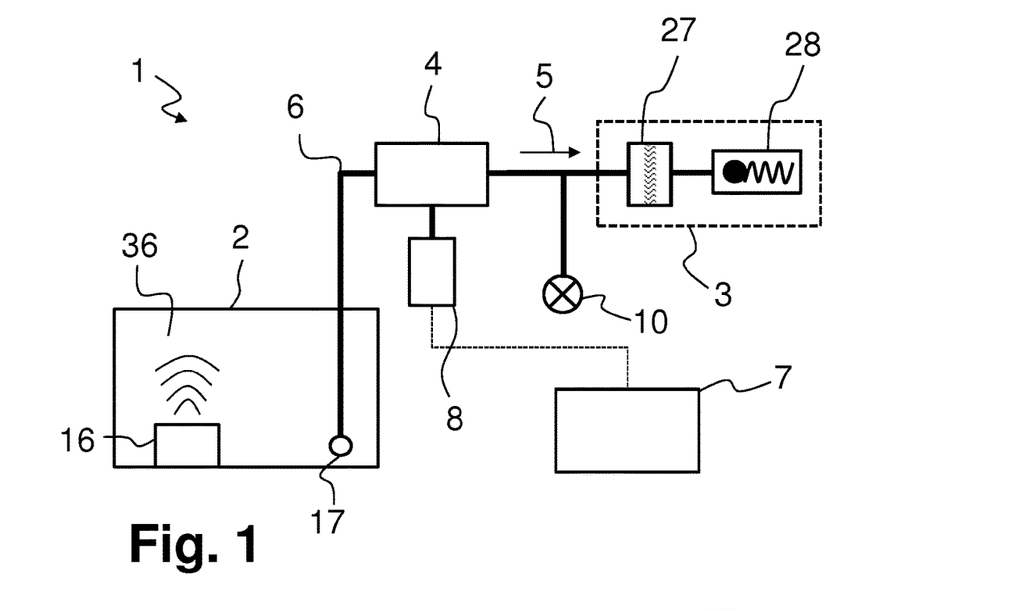
FIG. 1: shows a first design variant of the described device.
Figure 2:
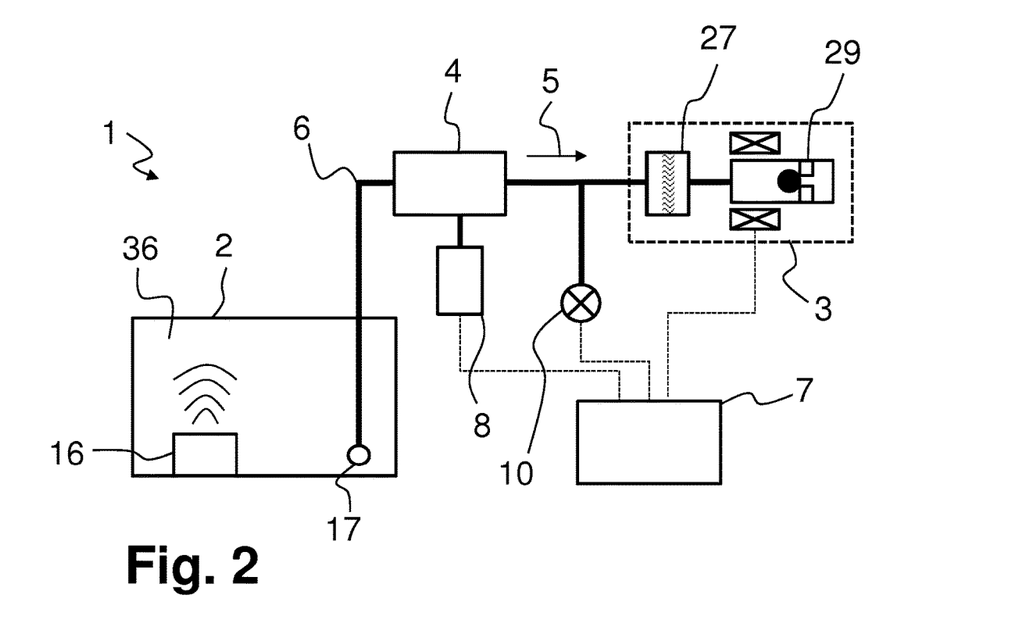
FIG. 2: shows a second design variant of the described device.
Figure 3:
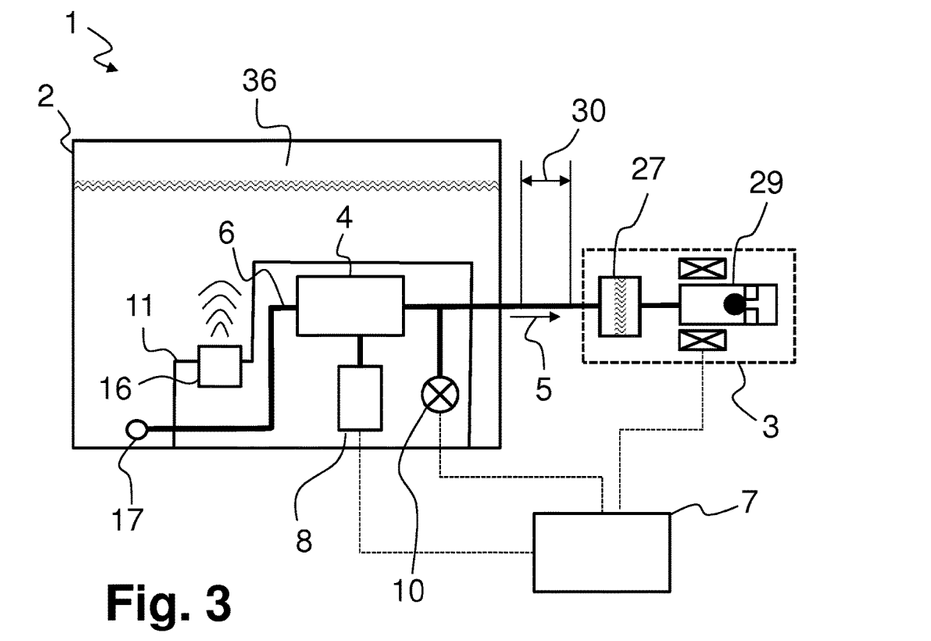
FIG. 3: shows a third design variant of the described device.

The device 1 as per FIGS. 1 to 3 has, in each case, a delivery line 6 which extends from an intake point 17 in a tank 2 to a supply unit 3. The liquid additive (in particular urea-water solution) can be stored in the tank 2. The intake point 17 is situated in an interior 36 of the tank 2, and at the intake point 17, liquid additive can enter from the tank 2 into the delivery line 6. In the delivery line 6 there is provided a positive-displacement pump 4 by which the liquid additive can be delivered along the delivery line 6 in the delivery direction 5. The positive-displacement pump 4 has a rotary drive 8 which can be controlled by a control unit 7. Furthermore, on the delivery line 6 downstream of the positive-displacement pump 4 as viewed in the delivery direction 5, there is arranged a pressure sensor 10 by which a pressure built up in the delivery line 6 by the positive-displacement pump 4 can be monitored. In the tank 2, there is provided in each case a level and quality sensor 16 by which a fill level and possibly also the quality of the liquid additive in the tank 2 can be monitored. The level and quality sensor 16 is for example in the form of an ultrasound sensor which radiates ultrasound waves that are reflected by a liquid surface in the tank 2 and that return to and strike the level and quality sensor 16 again, such that the height of the fill level in the tank 2 can be determined by a propagation time measurement. A propagation time measurement of the ultrasound waves with respect to a reference surface (not illustrated here) in the liquid additive can also be used for a quality measurement.

In FIG. 1, the supply unit 3 is configured with the aid of a passive valve 28 which automatically opens, and supplies liquid additive, when the pressure in the delivery line 6 downstream of the positive-displacement pump 4 as viewed in the delivery direction 5 exceeds a particular threshold value. Such a supply unit is of particularly simple construction. The supply unit 3 may additionally have a filter 27, which protects the passive valve against contaminants.

In FIG. 2, there is provided a supply unit 3 of relatively complex construction which, by the control unit 7, can be actively controlled in a manner dependent on the pressure measured by the pressure sensor 10. For this purpose, the supply unit 3 has an actively actuable injector valve 29. By such a supply unit 3, it is possible to actively define the pressure at which the dosing is performed. In this way, it is possible to vary the pressure in order to adjust a spray action and/or a spray profile of the supply unit 3.

FIG. 3 shows a design variant with a supply unit 3 corresponding to that of FIG. 2. Additionally, the device 1 is arranged in a housing 11, which is situated on the base of the tank 2. The level and quality sensor 16 is also provided in the housing 11, and the intake point 17 is also situated on the housing 11. This permits a particularly simple and inexpensive construction of the device 1. Between the supply unit 3 and the positive-displacement pump 4, the delivery line 6 preferably has a line length 30 of greater than 1 m and preferably less than 5 m.

Figure 4:
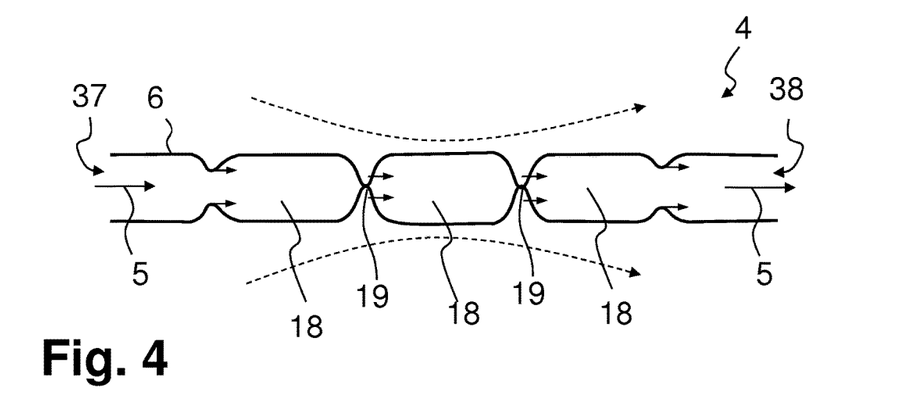
FIG. 4: shows a diagram describing the way in which delivery is effected in a typical positive-displacement pump.

FIG. 4 schematically shows the construction of a peristaltic pump, which is a typical positive-displacement pump 4 for the described method. The figure shows the delivery direction 5, which extends along the delivery line 6. The delivery line 6 is divided by seals 19 into different pump volumes 18. The seals 19 move through the delivery line 6 along the delivery direction 5. In this way, the liquid additive is forced along the delivery direction 5. The seals 19 and formed by constrictions and/or or closures of the delivery line 6 (itself), which constrictions and/or closures are, as viewed along the delivery direction 5, formed at an upstream end 37 of the delivery line 6 in the positive displacement pump 4 and eliminated again at a downstream end 38 of the delivery line 6 in the positive-displacement pump 4.

Figure 5:
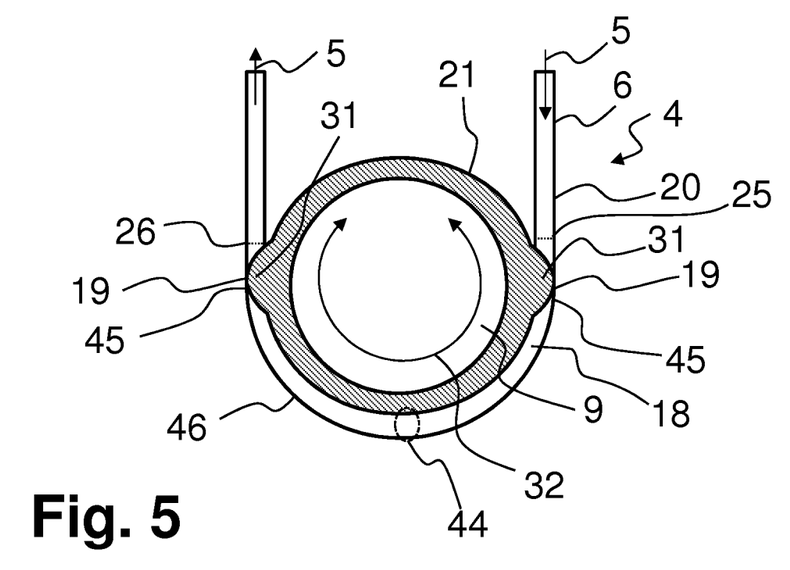
FIG. 5: shows a first design variant of a pump for the described method.

FIG. 5 shows a design variant of a positive-displacement pump 4, in which a movable pump element 9 in the form of an eccentric 21 is movable in a rotational motion. The movable pump element 9 has elevations 31. The delivery line 6 is formed, within the positive displacement pump 4, with a hose 20. During a rotation of the movable pump element 9, the elevations 31 cause the hose 20 to be deformed such that seals 19 are formed, giving rise to mutually separate pump volumes 18 in the delivery line 6. During a rotation of the movable pump element 9, the seals 19 and the pump volumes 18 are displaced, such that the liquid additive is moved through the delivery line 6 along the delivery direction 5. The flexible seal element 46 for forming the seals 19 is, in the case of the positive-displacement pump 4 as per FIG. 5, formed by the hose 20. The illustration shows the present position 45 of the two seals 19 and also the desired park position 44. When the seals 19 have been moved into the park position 44, both the inlet 25 and the outlet 26 are open and accessible such that, in the event of freezing, volume compensation with the positive-displacement pump 4 is possible. In the case of the positive-displacement pump 4 as per FIG. 5, the inlet 25 and the outlet 26 are the regions at which the eccentric 21 begins to act on the hose 20.

Figure 6:
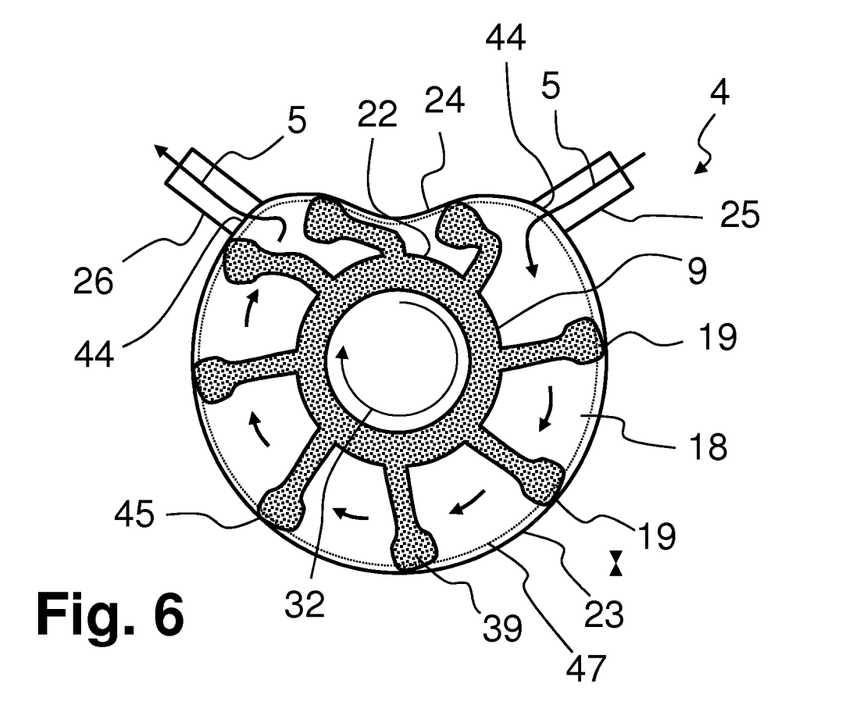
FIG. 6: shows a second design variant of a pump for the described method.

FIG. 6 shows a design variant of a positive-displacement pump 4 that has a movable pump element 9 in the form of an impeller 22. The impeller 22 is movable in a rotational motion 32 in an impeller chamber 23. The impeller 22 has impeller arms 39 that bear against a wall of the impeller chamber 23 and that form seals 19 with the wall of the impeller chamber 23. Thus, mutually separate pump volumes 18 are formed between the impeller arms 39. Liquid additive can flow into the impeller chambers 23 through an inlet 25 and out of the impeller chambers 23 through an outlet 26. The impeller chamber 23 is of largely cylindrical form, wherein the impeller 22 is arranged axially symmetrically in the impeller chamber 23. The impeller chamber 23 however has an indentation 24 by which the pump volumes 18 between the impeller arms 39 of the impeller 22 are compressed, such that, during an intended rotary movement 32 of the impeller, a flow of the liquid additive can take place only from the inlet 25 to the outlet 26, and not from the outlet 26 to the inlet 25. Such a pump has a rigid overall pump volume 47, which does not permit any change in volume in the event of freezing. Therefore, the park positions 44 for the seals 19 are in this case arranged at the inlet 25 and at the outlet 26 in order that the inlet 25 and the outlet 26 are closed off upon a stoppage of operation. For this purpose, the position 45 of the seals 19 is adapted to the park position 44.

Figure 7:
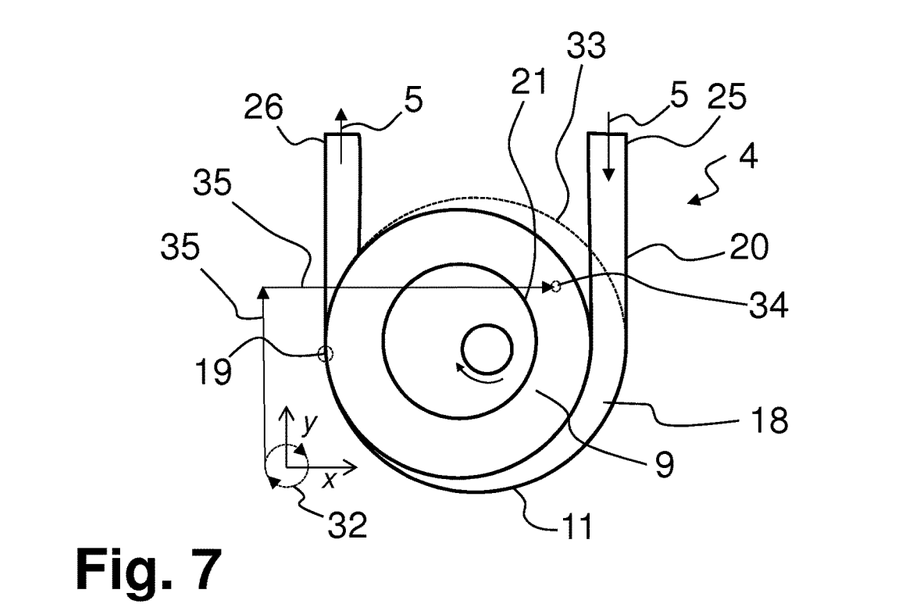
FIG. 7: shows a third design variant of a pump for the described method.

FIG. 7 shows a further design variant of a positive-displacement pump 4 for the described device. The positive-displacement pump 4 has a movable pump element 9 which, by an eccentric 21, is moved in a movement range 33 in accordance with a rotary movement 32. In FIG. 7, the rotary movement 32 is illustrated at the bottom left along with a coordinate system. By the rotary movement 32, the movable pump element 9 performs an eccentric oscillating movement. The movable pump element 9 itself does not rotate.

Each portion 34 of the movable pump element 9 is however moved in accordance with the rotary movement 32. This is indicated by the vector arrows 35 which, proceeding from the rotary movement 32 in the coordinate system, extend to the portion 34 and, do not change for each portion 34 of the movable pump element 9 during the eccentric oscillating movement of the movable pump element 9. The movable pump element 9 forms, in the housing 11, at least one seal 19 that delimits at least one pump volume 18. The seal 19 moves in the housing 11 as a result of the rotary movement 32. This movement results in a delivery of liquid additive. The liquid additive is delivered by the positive-displacement pump 4 along the delivery direction from an inlet 25 of the positive-displacement pump 4 to an outlet 26 of the positive-displacement pump 4. For a pump of this type, the above explanations regarding the position of the seals and regarding the desired park positions are correspondingly applicable, wherein the seals 19 can be placed into the suitable (predefined) park positions in each case in a manner dependent on where volume compensation should be possible in the shut-down situation.

Figure 8:
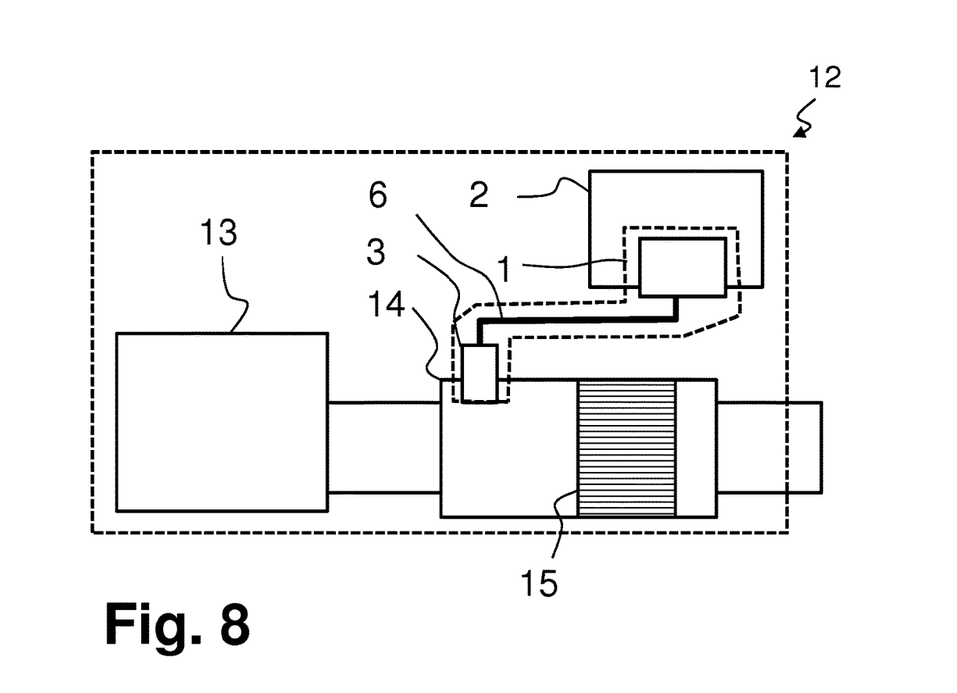
FIG. 8: shows a motor vehicle having a device for the described method.

FIG. 8 shows a motor vehicle 12 having an internal combustion engine 13 and having an exhaust-gas treatment device 14 for the purification of the exhaust gases of the internal combustion engine 13. In the exhaust-gas treatment device 14 there is arranged an SCR catalytic converter 15 by which selective catalytic reduction can be carried out in order to purify the exhaust gases of the internal combustion engine 13. The exhaust-gas treatment device 14 can have a liquid additive for the selective catalytic reduction method fed to it by a supply unit 3. Liquid additive is supplied from the tank 2 to the supply unit 3 by a device 1. The provision device 3 is, for this purpose, connected by way of a delivery line 6 to the device 1 and to the tank 2.

Figure 9:
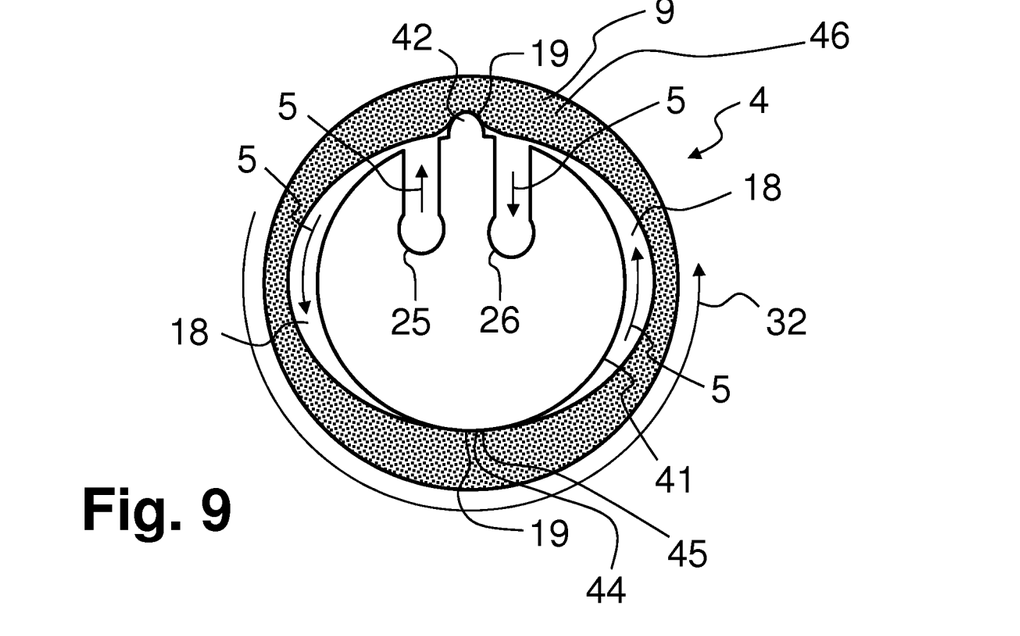
FIG. 9: shows a fourth design variant of a pump for the described method.

FIG. 9 shows a design variant of a positive-displacement pump 4, in which the movable pump element 9 is arranged at the outside around a static stator 41. The pump volumes 18 by which the liquid additive is delivered in the delivery direction 5 through the positive-displacement pump 4 are arranged between the movable pump element 9 and the static stator 41. The movable pump element 9 forms a flexible seal element 46. In the stator 41 there are situated an inlet 25 and an outlet 26 via which the liquid additives can flow into and out of the pump volumes 18. The pump volumes 18 are sealed off with respect to one another by seals 19. The movable pump element 18 is of elliptical shape, and the stator 41 is circular. The shorter axis of the elliptical shape of the movable pump element 18, preferably corresponds to the diameter of the movable pump element 18. In this way, it is preferably the case that at least two seals 19 always exist. At the seals 19, the stator 41 and the movable pump element 9 are in contact. The movable pump element 9 can be moved in a rotary movement, 32. The rotary movement 32 is basically possible in two directions. One direction of the rotary movement 32 corresponds to a delivery direction 5 of the liquid additive through the positive-displacement pump 4. The rotary movement 32 causes the seals 19 to move and the pump volumes 18 to be displaced from the inlet 25 to the outlet 26. The stator has a lug 42 between the outlet 26 and the inlet 25. The function of the lug 42 corresponds to the function of the indentation 24 in the case of the design variant of a positive-displacement pump illustrated in FIG. 6. The outlet 26 is sealed off in fluid-tight fashion with respect to the inlet 25 by the lug 42. For this purpose, the movable pump element 9 is preferably elastic. The movable pump element 9 is therefore deformed on the lug 42 in order that, despite the lug 42, the movable pump element can rotate all the way around the stator 41 in accordance with the rotary movement 32. By way of example, the illustration here shows a position 45 of the seal 19 in a park position 44, which permits volume compensation with the pump volumes 18 both through the inlet 25 and through the outlet 26.

Figure 10:
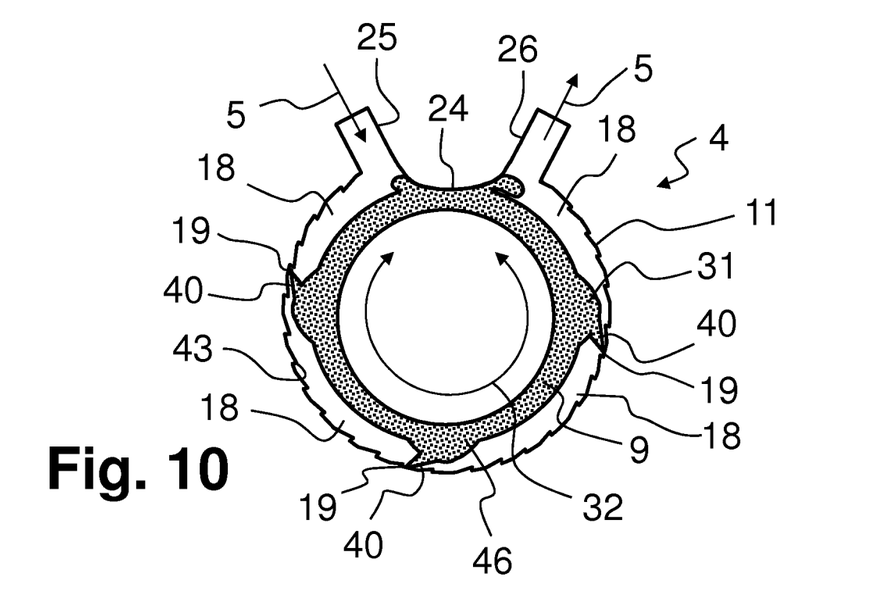
FIG. 10: shows a fifth design variant of a pump for the described method.

FIG. 10 illustrates a yet further design variant of a positive-displacement pump 4. In this case, too, a movable pump element 9 can be moved in a rotary movement 32. The rotary movement 32 is possible in two directions. One direction of the rotary movement 32 corresponds to a delivery direction 5 of the liquid additive through the positive-displacement pump 4. The movable pump element 9 is arranged in a housing 11 and forms a flexible seal element 46. The housing 11 has an inlet 25 and an outlet 26. The movable pump element 9 has multiple elevations 31 which bear against the housing 11 and thus form seals 19. Between the seals 19, the housing 11 and the movable pump element 9 there are situated closed pump volumes 18 by which the liquid additive is delivered during a rotary movement 32 of the movable pump element 9. Between the inlet 25 and the outlet 26, the housing has an indentation 24, which prevents liquid additive from flowing back from the outlet 26 to the inlet 25 counter to the delivery direction 5. When an elevation 31 of the movable pump element 9 passes the indentation 24 during the rotary movement 32, the elevation 31 is compressed. On the elevations 31 there are provided barbs 40 that can interlock with the housing 11 when the movable pump element 9 is moved counter to the delivery direction 5. The sealing action of the seals 19 can be increased by way of the interlocking of said barbs 40. On the housing 11 there may be provided a hook structure 43, which promotes the interlocking of the barbs 40 on the elevations 31.

Even though specific refinements of different devices have been discussed above in conjunction with the figures, it is nevertheless obvious that technical details of one design variant may be implemented separately or may arise in combination with technical details of other design variants/explanations above. Therefore, it is pointed out here that a combination of the illustrated technical features should be regarded as being "imperative" only if explicitly stated as such above, or if the functionality of the device or of the method would no longer be ensured otherwise.

The described device for supplying liquid additive is particularly inexpensive and can furthermore be evacuated such that freezing of the liquid additive does not cause damage to the device.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a device (1) for supplying a liquid additive, the device (1) having: at least one intake point (17) for extraction of the liquid additive from a tank (2), a valve-free delivery line (6) running from the intake point (17) to an injector (3), a valve-free positive-displacement pump (4), the positive-displacement pump (4) being configured to deliver the liquid additive from the tank (2) via the intake point (17) and along the delivery line (6) to the injector (3), wherein the positive-displacement pump (4) has a housing (11), a motor (8) controlled by a control unit (7), a movable pump element (9) configured to deliver, in a rotary movement of the movable pump element (9), the liquid additive and at least one seal (19) of the delivery line (6), the at least one seal (19) being displaceable, upon the rotary movement of the movable pump element (9), along the delivery line (6) for delivering the liquid additive, the method comprising:

a) detecting a stoppage of operation of the device (1);
b) establishing, when the stoppage of operation of the device (1) is detected, a position (45) of the seal (19) within the positive-displacement pump (4);
c) determining whether or not the established position (45) of the seal (19) corresponds to a provided park position (44) of the seal (19); and
d) changing the position (45) of the seal (19) to the provided park position (44) by a rotational movement of the movable pump element (9) when it is determined that the established position (45) of the seal (19) does not correspond to the provided park position (44) of the seal (19), wherein the movable pump element (9) comprises barbs (40) configured to interlock with corresponding hook structures (43) in the housing (11) when the movable pump element (9) is moved counter to the delivery direction (5), the method further comprising:

after step d), arresting the barbs (40) in the provided park position (44).

2. The method as claimed in claim 1, further comprising moving, in a rotary movement (32), the movable pump element (9) to deliver the liquid additive.

3. The method as claimed in claim 1, wherein the positive-displacement pump (4) has at least one flexible seal element (46) configured to form the at least one seal (19), the method further comprising the flexible seal element (46) enlarging at least one pump volume (18) of the positive-displacement pump (4) when a pressure higher than an operating pressure of the device (1) prevails within the at least one pump volume (18).

4. The method as claimed in claim 1, wherein, in the provided park position (44), an inlet (25) of the positive-displacement pump (4) is closed off by the at least one seal (19).

5. The method as claimed in claim 1, wherein, in the provided park position (44), an outlet (26) of the positive-displacement pump (4) is closed off by the at least one seal (19).

6. The method as claimed in claim 1, wherein, in the provided park position (44), an inlet (25) and an outlet (26) of the positive-displacement pump (4) are open.

7. The method as claimed in claim 1, wherein the positive-displacement pump (4) has a rigid overall pump volume (47), which does not change even when a pressure in the positive-displacement pump (4) lies above an operating pressure of the device (1), and wherein, in the provided park position (44), both an inlet (25) and an outlet (26) of the positive-displacement pump (4) are closed off by the at least one seal (19).

8. A motor vehicle (12) comprising:
an internal combustion engine (13);
an exhaust-gas treatment device (14) configured to purify exhaust gases of the internal combustion engine (13); and
a device (1) configured to feed a liquid additive to the exhaust-gas treatment device (14), the device (1) having:
at least one intake point (17) for extraction of the liquid additive from a tank (2),
a valve-free delivery line (6) running from the intake point (17) to an injector (3),
d) change the established position (45) of the seal (19) to the provided park position (44) by the rotational movement of the movable pump element (9) when it is determined that the established position (45) of the seal (19) does not correspond to the provided park position (44) of the seal (19); and then
e) arrest the barbs (40) in the park position (44).

* * * * *